Patented Nov. 10, 1942

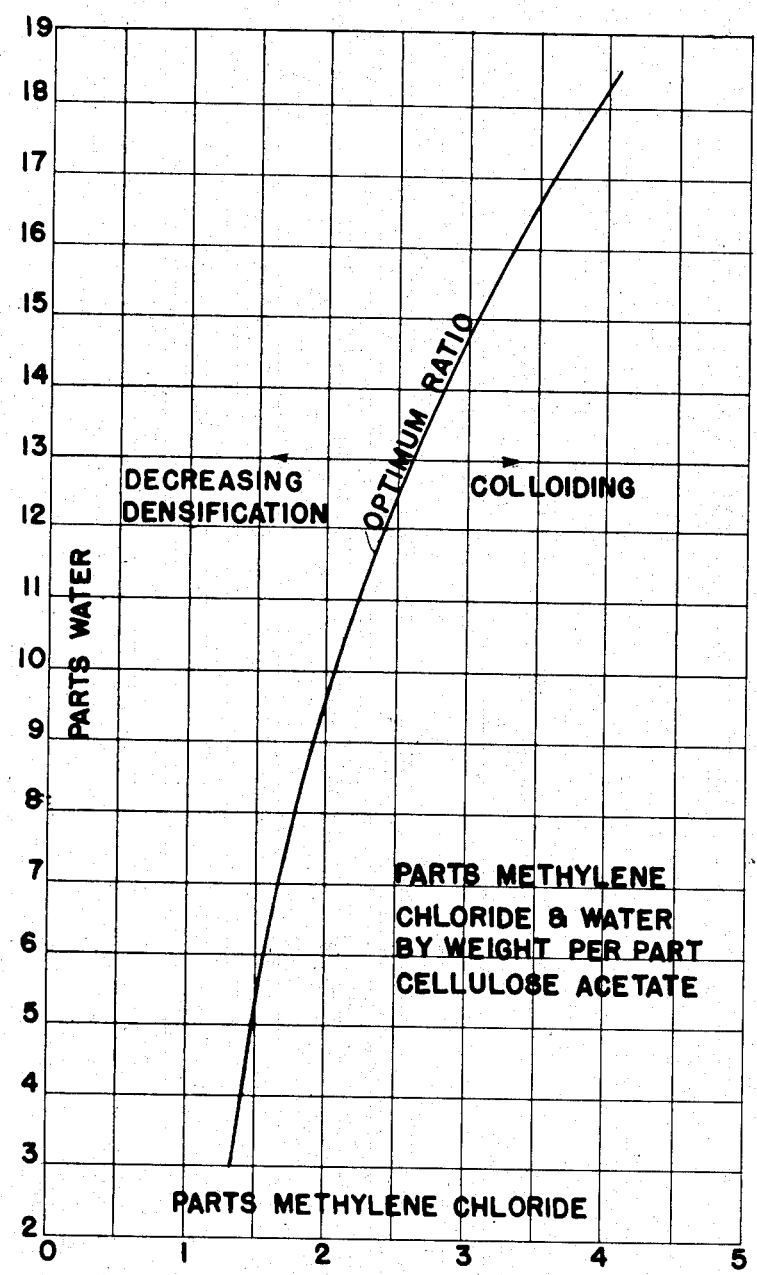

2,301,904

UNITED STATES PATENT OFFICE 2,301,904

TREATMENT OF CELLULOSE FATTY ACID ESTERS

Bayard T. Lamborn, Keyport, N. J., assignor to Hercules Powder Company, Wilmington, Del., a corporation of Delaware Application April 9, 1941, Serial No. 387,594

7 Claims. (Cl. 260—230)

This invention relates to a method of increasing the bulk density of cellulose fatty acid esters and, more particularly, of cellulose acetate.

Cellulose acetate as heretofore prepared by the solution process wherein the dope or reaction solution is precipitated in the form of a granular mass, slurry, or suspension, followed by pulverization, stabilization, drying and grinding to yield a "powder," had been subject to disadvantages. One objection has been the low bulk density of the product which makes it difficult to load a desirably heavy charge into mixers, injection molding machines, etc. and which results in entrainment of an objectionable amount of air bubbles. Another difficulty has been that the prior art products require an unduly long time to disperse in solvent and plasticizer in the preparation of compositions therefrom. These disadvantages are now thought to arise from irregularity in particle sizes and shapes. Some products are made up of particles having a jagged surface from which hairy fibers protrude. The irregularity of the particles and especially the hairs on the surface prevent close packing of the particles. Another difficulty has been excessive dustiness of the products heretofore available.

It is an object of the present invention to provide a process for improving the properties of solid granular cellulose fatty acid esters wherein a substantial portion or all of the acyl groups are acetyl.

Another object is to increase the bulk density of such a material.

Another object is to increase the dispersion rate of such esters.

Another object is to provide a process for densifying cellulose acetate particles obtained by precipitation with water from a dope made by a solution process.

Still other objects will more fully hereinafter appear.

I have discovered that the foregoing objects may be accomplished by treating the solid granular cellulose fatty acid ester wherein at least a substantial portion of the acyl groups are acetyl groups in suspension in at least 3 parts of water per part of the ester with a volatile normally liquid organic solvent which exerts a swelling or a solvent action on the ester and which is partially or completely immiscible in water, which has an end boiling point not above about 100° C. and an evaporation rate as measured by the well-known spot method of not over about 10, in amount and for a period of time sufficient to bring about a substantial increase in the density of the ester but insufficient to effect colloiding thereof to an objectionable extent, i. e., complete colloiding of the particles.

I have further discovered that this treatment results in an increased dispersion and dissolving rate for the cellulose ester particles.

The bulkiness and resulting large storage space necessary for cellulose fatty acid esters such as cellulose acetate has been a considerable disadvantage, and has caused difficulty in manufacture of compositions and molded articles from the ester. Consequently, any improvement in the direction of higher bulk density is of importance. If this can be accomplished without increasing the rate of dispersion or solution, it is desirable. The present invention goes still further and increases the density and, at the same time, the rate of dispersion and solution which is a most surprising accomplishment. At the same time, the dustiness of the product is reduced which is of considerable importance.

While the following description refers to cellulose acetate specifically, other cellulose fatty acid esters wherein the acyl groups comprise at least 10% acetyl may be treated by the process of the present invention, such as cellulose acetate propionate, cellulose acetate butyrate, cellulose acetate caproate, cellulose acetate stearate, etc. or other water-insoluble ester wherein at least 2 of the 3 hydroxyl groups per anhydroglucose unit have been esterified.

I prefer to apply the process to cellulose esters prepared by the solution process, and precipitated from the reaction solution by means of water. The resulting solid granular cellulose ester may be ground and then washed, or washed and then ground, prior to treatment in accordance with the present invention.

As the organic solvent for effecting compaction in accordance with the present invention, I prefer to use methylene chloride. This is an excellent swelling agent for cellulose acetate, is almost completely immiscible with water, boils at 40–42° C., and has an evaporation rate by the spot method (see Gardner, "Physical and Chemical Examination of Paints, Varnishes, Lacquers and Colors," 7th ed., 1935, page 1082-3) of 1.8. Instead of methylene chloride, I may use ethylene dichloride containing 5–25% of methyl or ethyl alcohol, methyl acetate, ethyl acetate containing 5–25% of methyl or ethyl alcohol, nitromethane either alone or containing up to 25% of methyl or ethyl alcohol, and equivalent solvents. Where an alcohol-containing solvent is used the alcohol should be present in sufficient amount that after it has distributed itself between the water and the water-immiscible portion of the solvent, the water-immiscible portion contains enough alcohol to have at least a swelling action on the cellulose acetate particles.

The amount of water employed may vary from about 3 to about 100 parts by weight per part of cellulose acetate. The water forms a slurry or suspension of the cellulose acetate and prevents the methylene chloride from converting the cellulose acetate into a plastic mass.

The amount of organic solvent employed will depend on the type of solvent used and upon the amount of water present. Where the solvent employed is methylene chloride, the optimum amount thereof will decrease as the amount of water increases. That is, the optimum ratio of water to methylene chloride will increase as the amount of water increases.

For methylene chloride, the preferred and optimum parts by weight of water and methylene chloride per part of cellulose acetate are indicated in the graph portrayed in the accompanying drawing.

In the drawing, the curve represents the optimum ratio of water and methylene chloride. This curve represents approximately a plot of the empirical equation $$(Y-1.00)^2 = 114X - 155$$

where $X$ = parts by weight of methylene chloride per 1 part cellulose acetate and where $Y$ = parts by weight of water per 1 part cellulose acetate.

On the right of the curve the phenomenon of colloiding takes place to an increasing extent, while on the left of the curve there occurs decreasing densification. The ratios represented by the curve therefore represent good densification without objectionable colloiding or agglomeration of the particles.

While it is preferred to use amounts of methylene chloride and water falling substantially on the curve, less preferably, I may use an amount of methylene chloride ranging from about 75% to about 125% of the optimum represented by the curve (in other words from about a 25% deficiency below the optimum to about a 25% excess over the optimum). In fact, amounts of methylene chloride falling outside the range just specified may be used although difficulties may arise due to insufficient densification for practical purposes or to colloiding to an objectionable extent (i. e. agglomeration to a continuous mass).

As stated above, the proportions of water and solvent used should be such as to give a substantial increase in the density of the cellulose acetate but not to cause agglomeration or gelatinization of the cellulose acetate particles to a plastic mass. Suitable proportions can be easily determined by those skilled in the art in the light of the foregoing disclosure. Generally, the methylene chloride will range between about 4% and about 50% by weight of the water.

The invention may be practiced by shaking pulverized precipitated cellulose acetate with water in amount sufficient to give a slurry or suspension and adding slowly with continued violent agitation the indicated amount of methylene chloride. The mixture may then be agitated for a prolonged period of time, say 10 to 60 minutes. If desired, water may be added at this point to stop the colloiding action of the methylene chloride. The methylene chloride may then be removed in any suitable manner, vacuum distillation, steam distillation, etc., so as to leave a water-wet mass of the agglomerated particles containing no solvent. The water may then be removed by decantation or draining followed by washing, again draining and evaporation. This procedure of removing the solvent before the water enables the water to be removed at temperatures which would cause the solvent, if it were present, to agglomerate the cellulose acetate particles excessively. After removal of methylene chloride and water, the mass of granules may be pulverized or ground to reduce the individual particle size to the desired extent whereupon the product is ready for use.

If desired, I may eliminate the necessity for size reduction of either the precipitated cellulose acetate or of the densified cellulose acetate by a preferred alternative process wherein I carry out precipitation in such a way as to give extremely small particles which when coagulated by the method of the present invention give a granular mass of the desired particle size.

The alternative procedure just referred to may comprise forming a cellulose acetate acid dope by the solution process in the well-known way, precipitating this dope as a pasty suspension by slowly introducing water while agitating fairly rapidly, extending this suspension to a thin slurry by further introduction of water, continuing agitation while introducing methylene chloride in amount sufficient to bring about coagulation and densification of the cellulose acetate particles, and discontinuing the introduction of methylene chloride before complete colloiding of the particles has occurred. The methylene chloride is then driven off, and the mass washed to remove acetic acid, drained and dried to directly yield a granular cellulose acetate of the size desired by the trade. In this way, no pulverization or other size reduction of the product is necessary, and considerable expense is eliminated. Example 10 below typifies this procedure.

Below are given a number of typical examples of the practice of the present invention.

*Examples 1 to 3*

Coarsely pulverized precipitated cellulose acetate was shaken with water in the amounts indicated in the following table until the ester was wet throughout. Then the indicated amount of methylene chloride was added and the mixture violently shaken for 10 minutes, whereupon the mixture was quickly drowned in a large excess of water to "set" the particles and prevent complete dispersion of the cellulose acetate in the methylene chloride. The cellulose acetate was removed by filtration, vacuum distilled to remove methylene chloride, dried, and pulverized to pass a 0.035" screen whereupon its density was measured.

| Example No. | Ratio of— | | | Density | |
| --- | --- | --- | --- | --- | --- |
| | Cellulose acetate | Water | MeOh | Initial material | Product |
| | | | | Gms. per cc. | Gms. per cc. |
| 1 | 1 | 68 | 2 | 0.240 | 0.250 |
| 2 | 1 | 68 | 3 | 0.240 | 0.270 |
| 3 | 1 | 68 | 5 | 0.230 | 0.345 |

*Example 4*

The procedure of Examples 1 to 3 was duplicated except that the agitation was effected in a cylindrical vessel having fixed and rotating blades, and the relative proportions were: 1 cellulose acetate:10 water:3.3 methylene chloride. The density was increased from 0.291 to 0.415 grams per cc.

*Example 5*

The procedure of Example 4 was duplicated except that the run was performed in a "Miller" beater, a device in which the slurry is fed over and under a cutting wheel revolving between curved surfaces, and the ratio was: 1 cellulose acetate:12.5 water:5 methylene chloride. The density was increased from 0.291 to 0.386 grams per cc.

*Example 6*

Coarsely pulverized precipitated cellulose acetate wet with water from the washing step was admixed with more water and agitated violently for about 2 hours during addition of methylene chloride, the ratio being: 1 cellulose acetate:18 water:4 methylene chloride. After distillation, drying, and pulverizing so as to pass a 0.035" screen, the product had a bulk density of 0.47 g. per cc. as compared with 0.28 for the original.

*Example 7*

Example 6 was duplicated except that the ratio was: 1 cellulose acetate:5 water:1.5 methylene chloride. The product had a bulk density of 0.51 g. per cc.

*Example 8*

An attempt was made to duplicate Example 6 using a ratio of: 1 cellulose acetate:4 water:1.6 methylene chloride. The particles became plastic and had a tendency to stick together during the treatment, indicating that too much methylene chloride was used for best results. After removing the methylene chloride from the mixture by vacuum distillation, the agglomerates were broken up by milling. After washing and drying, the product passing a 0.035" screen had a density of 0.55 g. per cc. and the portion passing a 40 mesh screen had a density of 0.44 g. per cc.

*Example 9*

Six hundred parts by weight (dry basis) precipitated cellulose acetate was milled, washed to an acidity of 0.5% and admixed with water in such amount that in all 5845 parts of water were present. While agitating vigorously, 1225 parts of methylene chloride were added at a rate of 30 to 40 parts per minute. Thereafter, agitation was continued for about 20 minutes. The ratio used was approximately 1 cellulose acetate:10 water:2 methylene chloride. The methylene chloride was then distilled off in a vacuum, the cellulose acetate dried and pulverized through a 0.035" screen. The product had a density of 0.44 g. per cc. whereas the original had a density of 0.28 g. per cc.

*Example 10*

Into cellulose acetate acid dope (made by a solution process by acetylating cellulose with a mixture of acetic acid, acetic anhydride and a small amount of sulfuric acid as a catalyst followed by hydrolysis with an amount of water insufficient to cause precipitation) water was run very slowly with agitation until the acetate precipitated as a pastry suspension. This was extended to a thin slurry by agitating with additional water. While agitating very rapidly, enough methylene chloride was added slowly to effect coagulation and coalescence but short of colloiding. The ratio was 1 cellulose acetate:3.74 water:0.74 methylene chloride:1.87 acetic acid. The resulting strength of aqueous acetic acid was approximately 30%. The methylene chloride was then removed by heating. Upon washing and drying, the cellulose acetate had a bulk density of 0.43 gms. per cc. and required neither grinding nor pulverizing. In appearance it resembled pulverized cellulose acetate which had been densified by the process of the preceding examples. The procedure of this example was especially advantageous because it eliminates the need for precipitating, drying, and pulverizing the cellulose acetate prior to densification treatment in accordance with the present invention.

In addition to increasing the density, the procedure of the foregoing examples resulted in a marked decrease in the time required for colloiding the cellulose acetate. Thus, the products of the examples when mixed in a "Day" mixer with plasticizer and solvent in accordance with the following formula

| | Grams |
|---|---|
| Cellulose acetate | 100 |
| Dimethyl phthalate | 30 |
| Acetone | 40 |
| Ethyl alcohol | 50 | gave a time of 7-9 minutes as compared with 18-23 minutes for the initial untreated material.

It will be understood that the details and examples hereinbefore set forth are illustrative only and that the invention as broadly described and claimed is in no way limited thereby.

What I claim and desire to protect by Letters Patent is:

1. The process of increasing the bulk density of a water-insoluble solid cellulose fatty acid ester wherein at least a substantial proportion of the acyl groups are acetyl groups, which comprises treating said ester in suspension in from about 3 to about 100 parts of water per part of said ester with a volatile normally liquid organic solvent which is capable of exerting at least a swelling action upon said ester, which is at least partially immiscible with water, which has an end boiling point not above about 100° C. and an evaporation rate by the spot method of not over about 10, in an amount and for a period of time sufficient to substantially increase the bulk density of said ester but insufficient to cause objectionable colloiding thereof.

2. The process of increasing the bulk density of a water-insoluble solid cellulose fatty acid ester wherein at least a substantial proportion of the acyl groups are acetyl groups, which comprises treating said ester in suspension in from about 3 to about 100 parts of water per part of said ester with methylene chloride in an amount and for a period of time sufficient to substantially increase the bulk density of said ester but insufficient to cause objectionable colloiding thereof.

3. The process of increasing the density and dispersion rate of particles of precipitated water-insoluble cellulose acetate which comprises agitating said particles with at least 3 parts of water per part of said particles and methylene chloride in an amount falling within the range of from about 4% to about 50% of the weight of said water.

4. The process of increasing the bulk density of particles of precipitated water-insoluble cellulose acetate which comprises agitating said particles with at least 3 parts of water per part of said particles and methylene chloride in approximately the amount defined by the following equation:

$$(Y-1)^2 = 114X - 155$$

where X is the number of parts of methylene chloride and Y is the number of parts of water per part of said cellulose acetate.

5. The process of increasing the bulk density of particles of precipitated water-insoluble cellulose acetate which comprises agitating said particles with at least 3 parts of water per part of said particles and methylene chloride in amount ranging from about 75% to about 125% of the amount defined by the following equation:

$$(Y-1)^2 = 114X - 155$$

where X is the number of parts of methylene chloride and Y is the number of parts of water per part of said cellulose acetate.

6. The process of increasing the bulk density of particles of precipitated water-insoluble cellulose acetate which comprises agitating said particles with water in amount sufficient to give a slurry and an amount of methylene chloride smaller than the amount of water and sufficient to bring about substantial densification of said acetate but insufficient to bring about objectionable colloiding thereof, removing the methylene chloride from the resulting mixture by vacuum distillation, washing, drying, and comminuting to obtain the product of increased bulk density.

7. The process which comprises forming a cellulose acetate dope by the solution process, said dope being ready for precipitation in the conventional manner, precipitating said dope as a pasty suspension by slow introduction of water with agitation, extending the suspension to a thin slurry by further introduction of water, agitating while introducing methylene chloride until coagulation and densification of the cellulose acetate particles has occured, discontinuing said introduction before complete colloiding of particles has occurred, driving off the methylene chloride, washing, and drying to obtain a granular cellulose acetate of high bulk density.

BAYARD T. LAMBORN.